July 28, 1931. H. A. BRASSERT 1,815,899
METHOD FOR THE TREATMENT OF IRON ORE
Filed Jan. 14, 1929
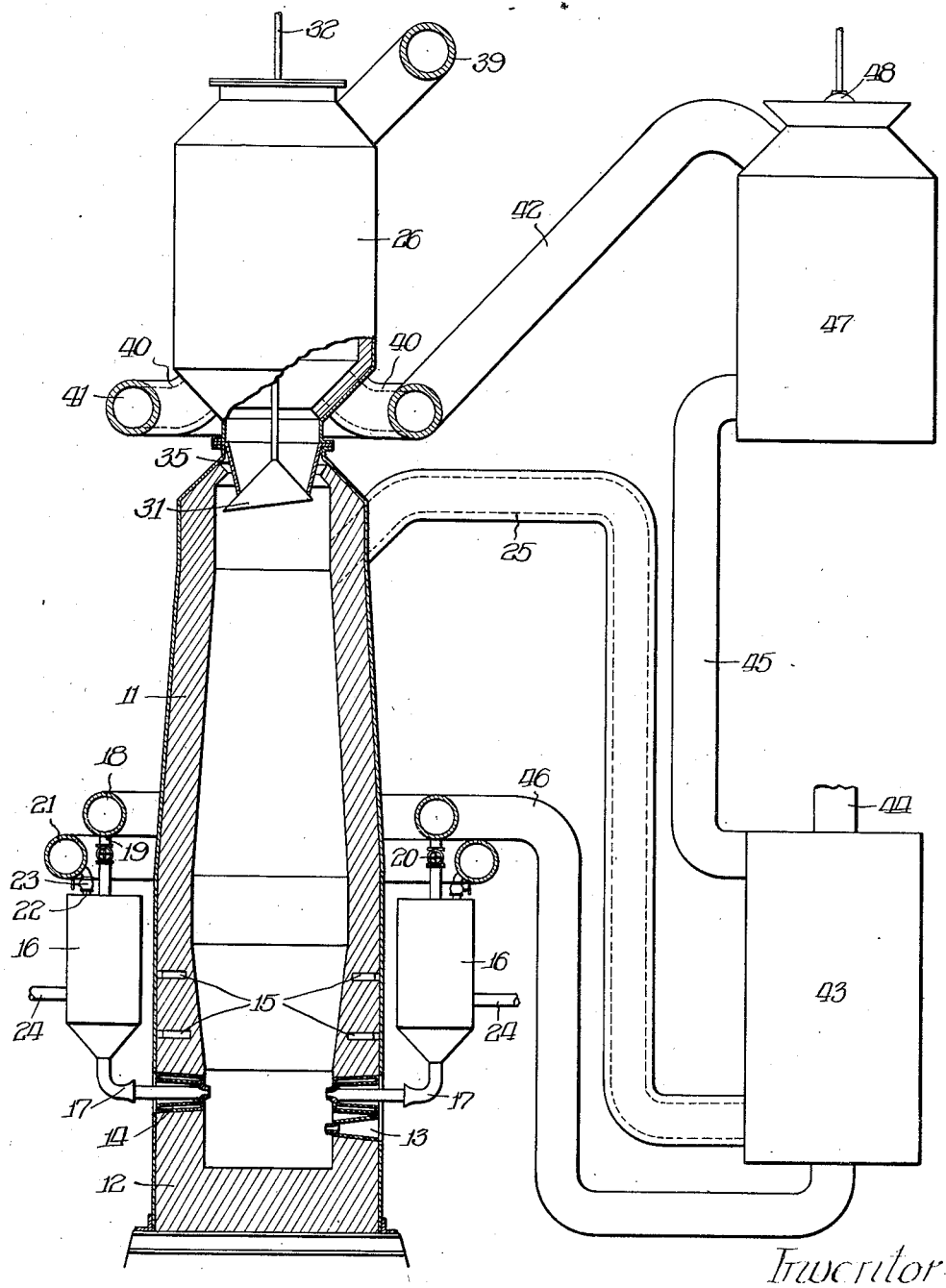
Inventor:
Herman A. Brassert,
By Wilkinson Huxley Byron & Knight
Attys Patented July 28, 1931

1,815,899

UNITED STATES PATENT OFFICE

HERMAN A. BRASSERT, OF CHICAGO, ILLINOIS, ASSIGNOR TO H. A. BRASSERT & COMPANY, OF CHICAGO, ILLINOIS, A CORPORATION OF ILLINOIS

METHOD FOR THE TREATMENT OF IRON ORE

Application filed January 14, 1929. Serial No. 332,570.

This invention relates to a new and improved method for the treatment of iron ore, and more particularly to a method whereby the ore may be reduced in one stage of the operation and melted in a second stage of the operation.

The present method in general use for the reduction of iron ore involves the use of a blast furnace in which the ore is both reduced and melted. The blast furnace is a shaft type of furnace into which the ore, fluxing material and the fuel, consisting of coke, are introduced, and is uneconomical in operation as it requires approximately one ton of coke to reduce and melt one ton of pig iron. The reducing portion of the operation is carried on in the upper part of the blast furnaces by means of the carbon monoxide gas which is produced by the partial combustion in the lower portion of the furnace. Reduction also takes place by means of the solid carbon of the fuel at high temperatures lower in the furnace. The indirect reduction by means of the carbon monoxide gas takes place at low temperatures while the direct reduction by means of the solid carbon takes place at high temperatures. High temperatures are unnecessary, however, for the reduction which can be carried out by the indirect method. Theoretically, if both the reduction and the melting process could be carried on independently with the greatest possible economy of heat, the process could be carried through with about one-third the amount of the fuel used in normal blast furnace operation.

The produce of the blast furnace is pig iron which, according to the usual practice, contains approximately 4% of carbon. In the manufacture of steel it is necessary to eliminate the greater portion of this carbon and such elimination in the open hearth process usual in steel making requires the greater part of the time involved in that process. Consequently if a pig iron can be produced economically which has a carbon content materially less than the usual 4%, the time and cost of the final steel making step in the open hearth furnace can be materially reduced. The reduction in the time for each open hearth heat will reduce all expenditures for fuel, labor, maintenance and overhead charges. It is impossible, however, to economically produce a pig iron having a carbon content materially below 4% in the blast furnaces of the present type, using solid fuel. The carbon content can be very materially reduced, however, by means of processes which eliminate the solid fuel from the furnace charge, or greatly reduce the solid fuel. Such processes involve the combustion of fuel externally of the furnace itself, the highly heated products of combustion being introduced into the furnace. The combustion may be so regulated that the products of combustion may be oxidizing, neutral, or reducing in their effect. By using pre-heated air and carrying the combustion of the powdered coal or other fuel on under pressure, I am able to produce temperatures sufficiently high to permit the melting of iron of very low carbon content approaching and within the limits of steel. By this method the use of the open hearth step in the production of steel may be eliminated entirely, and steel may be produced in one continuous operation from the iron ore and reduced iron.

My method is preferably carried on in two stages or steps, the first step involving the reduction of the ore and the second step the melting of the reduced ore. By carrying these two steps on in separate chambers, I am able to carry out each step under the most economical temperature conditions.

It is an object of the present invention to provide a new and improved method for the treatment of iron ores whereby the ore may be reduced and melted with great economy.

It is an additional object to provide a method whereby the reduction and melting may be carried out in separate chambers under differing heat conditions.

It is also an object to provide a method wherein the final product may be low in carbon, approaching or within the limits of steel.

Other and further objects will appear as the description proceeds.

I have shown one form of apparatus adapted for carrying out my invention in the single figure of the accompanying drawing.

In the drawing, the vertical shaft furnace 11 is shown as having a closed bottom 12 and tap hole 13. The water cooled tuyères 14 serve to protect the tuyère pipes 17 which lead from the external combustion chambers 16. The furnace is also shown as provided with water cooled members 15 inserted in the walls. The bustle pipe 18 serves to introduce the heated air for combustion and this air is discharged into the combustion chamber 16 through the pipes 19 controlled by valves 20.

The fuel for combustion purposes is led through the bustle pipe 21 and down through pipes 22 to the combustion chamber 16, these pipes 22 being controlled by valves 23. The gaseous products of combustion from the top of the furnace pass out through the passage 25 to the heat exchange apparatus 43, which may be a recuperator or similar device. The air to be preheated is introduced into the heat exchanger 43 through passage 44 and is led to the bustle pipe 18 by the passage 46. The products of combustion are led from the heat exchanger 43 through passage 45 to the apparatus 47 which may be in the nature of a gas producer containing a body of coke. This coke is introduced through the bell 48.

The products of combustion which have their carbon monoxide content increased in the apparatus 47, are led from this apparatus through passage 42 to the bustle pipe 41 from which they pass through passages 40 to the reducing chamber 46. From the reducing chamber the gases pass off through passage 39. The lower end of the chamber 26 is in communication with a hopper 35 located at the top of the shaft furnace 11. This hopper 35 is closed by the vertically movable charging bell 31 operated by the rod 32 extending above the chamber 26.

While I have illustrated this one form of apparatus adapted for carrying out the method, it will be understood that both steps in the method may be carried out in varying forms of apparatus. I utilize the method of indirect reduction by means of carbon monoxide gas, which method of reduction may be carried on at low temperatures with economy of heat. The second step, the melting of the reduced ore, is preferably carried on in a shaft furnace of the cupola or blast furnace type. The products of combustion from the second step may be utilized in the first, or reducing step. Should the products of combustion be low in carbon monoxide, this may be increased in any desired manner. One method which may be used consists in passing the heated gases through beds of coke wherein carbon dioxide may be broken down to carbon monoxide. If necessary additional heat may be furnished these gases by partial combustion of additional fuel.

The reduction of the ore may be carried on in a vertical shaft furnace, or may be carried on in a rotary kiln, or other types of furnace may be used which are suitable for passing the gas through the finely divided ore. If a rotary kiln is used, additional heat may be imparted to the charge by applying heat to the outside of the kiln.

Another method of supplying additional heat is the mixing of a portion of fuel with the ore and admitting air for partial combustion with the gases. A vertical furnace having a rotating grate or other means for causing the ore to pass down through the furnace and to keep the mass in the furnace open for the passage of gases may be used. A suitable furnace of this type may be constructed along the lines of the gas generator described in the patent to Andrews, 1,709,107 of April 16, 1929.

The reduced ore from the first step in the process may be passed by any suitable means, such as conveyors, to the shaft furnace used in the second step in the process. In order to produce an iron low in carbon, I preferably use for the second step a furnace fired in the manner disclosed in the application of Daniel H. Meloche, Serial No. 185,041, filed April 19, 1927. In this furnace, combustion takes place outside of the shaft of the furnace and out of contact with the reduced ore. High temperatures may be reached by burning the fuel under pressure and by pre-heating the air. The nature of the process may be so regulated as to prevent a material addition of carbon to the iron in the melting process.

In the usual type of blast furnaces, the products of combustion in the lower portion of the furnace pass upwardly through the entire height of the furnace and this creates back pressures ranging from 12 to 30 pounds. The presence of coke in the furnace keeps the stock column open and permits the distribution and circulation of the gases. By the use of the separate apparatus for the reducing step and by the use of a melting furnace utilizing external combustion, the height of the melting column in such a furnace need not be more than 30 feet, and under most conditions a column of 15 to 20 feet is sufficient. This diminished height of the column is important in reducing back pressures, especially as the charge will contain little or no coke to keep it open. The gases may leave the top of the melting furnace at low pressure and the necessary pressure for forcing them through the reducing apparatus may be secured by placing a hot fan between the two sets of apparatus. It may be taken care of by a fan in the stack flue at the exit end of the reducing apparatus, in which case a fan working at lower temperatures may be used.

While I have described certain apparatus and manners of carrying out my improved method, it will be understood that it may be carried out in other forms of apparatus and in other ways, and I contemplate such changes and modifications as come within the spirit and scope of the appended claim.

I claim:

The method of treating iron ore which comprises reducing the ore in one chamber by passing heated reducing gases through the chamber, transferring the reduced ore to a second chamber, melting the reduced ore in said second chamber by means of heated gases which are the product of combustion carried on mainly externally of the chamber, and increasing the carbon monoxide content of the gaseous products of the melting treatment and utilizing said gaseous products in carrying out the reduction.

Signed at Chicago, Illinois, this 5th day of January, 1929.

HERMAN A. BRASSERT.